United States Patent
Chun et al.

(10) Patent No.: US 9,078,236 B2
(45) Date of Patent: Jul. 7, 2015

(54) RANDOM ACCESS SCHEME FOR PREVENTING UNNECESSARY RETRANSMISSION AND USER EQUIPMENT FOR THE SAME

(75) Inventors: Sung Duck Chun, Anyang-Si (KR); Sung Jun Park, Anyang-Si (KR); Seung June Yi, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 12/670,773

(22) PCT Filed: Jan. 5, 2010

(86) PCT No.: PCT/KR2010/000036
§ 371 (c)(1),
(2), (4) Date: Jul. 8, 2011

(87) PCT Pub. No.: WO2010/077122
PCT Pub. Date: Jul. 8, 2010

(65) Prior Publication Data
US 2011/0261763 A1 Oct. 27, 2011

Related U.S. Application Data

(60) Provisional application No. 61/142,613, filed on Jan. 5, 2009.

(30) Foreign Application Priority Data

Dec. 24, 2009 (KR) .................. 10-2009-0130622

(51) Int. Cl.
*H04W 74/00* (2009.01)
*H04W 56/00* (2009.01)
*H04W 74/08* (2009.01)

(52) U.S. Cl.
CPC ........ *H04W 74/008* (2013.01); *H04W 56/0005* (2013.01); *H04W 56/0045* (2013.01); *H04W 74/0833* (2013.01)

(58) Field of Classification Search
None
See application file for complete search history.

(56) References Cited

U.S. PATENT DOCUMENTS 6,594,240 B1    7/2003    Chuah et al.
6,785,548 B2    8/2004    Moulsley et al.
(Continued)

FOREIGN PATENT DOCUMENTS

CN    1315099 A    9/2001
CN    101188852 A    5/2008
(Continued)

OTHER PUBLICATIONS

Nokia Siemens Networks, Nokia, "Triggers for Power Headroom Reports in EUTRAN Uplink," Agenda Item 6.3.2, Discussion/Decision, 3GPP TSG RAN WG1 Meeting #52bis, Shenzhen, China, R1-081464, Mar. 31-Apr. 4, 2008, One page.
(Continued)

*Primary Examiner* — Alpus H Hsu
*Assistant Examiner* — Hooman Houshmand
(74) *Attorney, Agent, or Firm* — Birch, Stewart, Kolasch & Birch, LLP

(57) ABSTRACT

A random access scheme for preventing unnecessary retransmission and a user equipment for the same are disclosed. If a Contention Resolution (CR) timer expires in contention resolution during a random access procedure or if a Physical Downlink Control Channel (PDCCH) signal or a Physical Downlink Shared Channel (PDSCH) signal associated with the PDCCH signal does not match an identifier of a terminal, a Hybrid Automatic Repeat Request (HARQ) buffer for storing a Medium Access Control Packet Data Unit (MAC PDU) transmitted in the random access procedure is flushed such that unnecessary data retransmission can be prevented.

13 Claims, 10 Drawing Sheets

(56) References Cited

U.S. PATENT DOCUMENTS

| | | | |
|---|---|---|---|
| 6,836,469 B1 | 12/2004 | Wu | |
| 6,950,417 B2 | 9/2005 | Soliman | |
| 7,075,971 B2 | 7/2006 | Parsa et al. | |
| 7,848,346 B2 | 12/2010 | Park et al. | |
| 7,957,298 B2 | 6/2011 | Yi et al. | |
| 7,986,946 B2 | 7/2011 | Pettersson | |
| 8,223,708 B2 | 7/2012 | Guo | |
| 8,274,969 B2* | 9/2012 | Wu | 370/354 |
| 8,908,570 B2* | 12/2014 | Yu et al. | 370/278 |
| 2001/0043582 A1 | 11/2001 | Nakada | |
| 2002/0009067 A1 | 1/2002 | Sachs et al. | |
| 2002/0154653 A1 | 10/2002 | Beneviste | |
| 2002/0167920 A1 | 11/2002 | Miyazaki et al. | |
| 2003/0095534 A1 | 5/2003 | Jiang | |
| 2004/0185892 A1 | 9/2004 | Iacono et al. | |
| 2005/0014508 A1 | 1/2005 | Moulsley et al. | |
| 2005/0078641 A1 | 4/2005 | Kim | |
| 2005/0117675 A1 | 6/2005 | Das et al. | |
| 2005/0120097 A1 | 6/2005 | Walton et al. | |
| 2005/0141436 A1 | 6/2005 | Dick et al. | |
| 2005/0249123 A1 | 11/2005 | Finn | |
| 2006/0013182 A1 | 1/2006 | Balasubramanian et al. | |
| 2006/0013268 A1 | 1/2006 | Terry | |
| 2006/0280145 A1 | 12/2006 | Revel et al. | |
| 2007/0076679 A1 | 4/2007 | Lee | |
| 2007/0140178 A1 | 6/2007 | Jung et al. | |
| 2007/0171933 A1 | 7/2007 | Sammour et al. | |
| 2007/0206531 A1 | 9/2007 | Pajukoski et al. | |
| 2008/0008212 A1 | 1/2008 | Wang et al. | |
| 2008/0043771 A1 | 2/2008 | Cho et al. | |
| 2008/0096563 A1 | 4/2008 | Fischer et al. | |
| 2008/0098234 A1 | 4/2008 | Driscoll et al. | |
| 2008/0186892 A1 | 8/2008 | Damnjanovic | |
| 2008/0188247 A1 | 8/2008 | Worrall | |
| 2008/0192766 A1 | 8/2008 | Ranta-Aho et al. | |
| 2008/0207150 A1 | 8/2008 | Malladi et al. | |
| 2008/0232317 A1 | 9/2008 | Jen | |
| 2008/0294958 A1 | 11/2008 | Lee et al. | |
| 2008/0310396 A1* | 12/2008 | Park et al. | 370/350 |
| 2008/0313300 A1 | 12/2008 | Alanara et al. | |
| 2008/0316961 A1 | 12/2008 | Bertrand et al. | |
| 2009/0046641 A1* | 2/2009 | Wang et al. | 370/329 |
| 2009/0052388 A1 | 2/2009 | Kim et al. | |
| 2009/0086671 A1* | 4/2009 | Pelletier et al. | 370/329 |
| 2009/0088195 A1 | 4/2009 | Rosa et al. | |
| 2009/0156194 A1 | 6/2009 | Meylan | |
| 2009/0163211 A1 | 6/2009 | Kitazoe et al. | |
| 2009/0175187 A1 | 7/2009 | Jersenius et al. | |
| 2009/0186624 A1 | 7/2009 | Cave et al. | |
| 2009/0196208 A1* | 8/2009 | Yu et al. | 370/311 |
| 2009/0213968 A1 | 8/2009 | Tormalehto | |
| 2009/0225711 A1 | 9/2009 | Sammour et al. | |
| 2009/0232058 A1 | 9/2009 | Lee et al. | |
| 2009/0232076 A1* | 9/2009 | Kuo | 370/329 |
| 2009/0238141 A1 | 9/2009 | Damnjanovic et al. | |
| 2009/0239545 A1 | 9/2009 | Lee et al. | |
| 2009/0259910 A1 | 10/2009 | Lee et al. | |
| 2009/0279495 A1* | 11/2009 | Yoo | 370/329 |
| 2009/0300457 A1* | 12/2009 | Kuo | 714/749 |
| 2009/0303954 A1 | 12/2009 | Guo | |
| 2009/0305665 A1 | 12/2009 | Kennedy et al. | |
| 2009/0316586 A1 | 12/2009 | Yi et al. | |
| 2009/0316593 A1 | 12/2009 | Wang et al. | |
| 2010/0027511 A1 | 2/2010 | Terry | |
| 2010/0034162 A1* | 2/2010 | Ou et al. | 370/329 |
| 2010/0080181 A1 | 4/2010 | Yamada et al. | |
| 2010/0093386 A1 | 4/2010 | Damnjanovic et al. | |
| 2010/0111067 A1* | 5/2010 | Wu | 370/345 |
| 2010/0172299 A1 | 7/2010 | Fischer et al. | |
| 2010/0202288 A1 | 8/2010 | Park et al. | |
| 2010/0226325 A1 | 9/2010 | Chun et al. | |
| 2010/0260136 A1 | 10/2010 | Fan et al. | |
| 2010/0281486 A1 | 11/2010 | Lu et al. | |
| 2010/0330995 A1 | 12/2010 | Aoyama et al. | |
| 2011/0002262 A1* | 1/2011 | Wang et al. | 370/328 |
| 2011/0103499 A1* | 5/2011 | Cheng et al. | 375/260 |
| 2011/0116364 A1 | 5/2011 | Zhang et al. | |
| 2011/0216705 A1 | 9/2011 | Lee et al. | |
| 2011/0216706 A1 | 9/2011 | Lee et al. | |
| 2014/0092851 A1* | 4/2014 | Wang et al. | 370/329 |

FOREIGN PATENT DOCUMENTS

| | | |
|---|---|---|
| EP | 1755355 A1 | 2/2007 |
| EP | 1973281 A2 | 9/2008 |
| EP | 1976170 A1 | 10/2008 |
| EP | 2020821 A1 | 2/2009 |
| EP | 2094053 A1 | 8/2009 |
| JP | 2000-341204 A | 12/2000 |
| JP | 2007-266733 A | 10/2007 |
| JP | 2009-525655 A | 7/2009 |
| JP | 2009-303213 A | 12/2009 |
| JP | 2010-518724 A | 5/2010 |
| JP | 2011-508538 A | 3/2011 |
| JP | 2011-509049 A | 3/2011 |
| KR | 1020050057926 A | 6/2005 |
| KR | 10-0567211 B1 | 4/2006 |
| KR | 10-2006-0115175 A | 11/2006 |
| KR | 10-2007-0107619 A | 11/2007 |
| KR | 10-2007-0108300 A | 11/2007 |
| KR | 10-2007-0109313 A | 11/2007 |
| KR | 10-2008-0016367 | 2/2008 |
| KR | 10-2008-0026583 A | 3/2008 |
| KR | 10-0816598 A | 3/2008 |
| KR | 10-2008-0039177 A | 5/2008 |
| KR | 10-2008-0039294 A | 5/2008 |
| KR | 10-2008-0049596 A | 6/2008 |
| KR | 10-2008-0065880 A | 7/2008 |
| KR | 10-2008-0112649 A | 12/2008 |
| KR | 10-2009-0014937 A | 2/2009 |
| KR | 10-2009-0016402 A | 2/2009 |
| KR | 10-2009-0084690 A | 8/2009 |
| KR | 10-0938102 B1 | 1/2010 |
| RU | 2233546 C2 | 7/2004 |
| RU | 2332802 C2 | 1/2008 |
| WO | WO-2004-056009 A1 | 7/2004 |
| WO | WO 2006/118427 A2 | 11/2006 |
| WO | WO-2007/082407 A1 | 7/2007 |
| WO | WO-2007/083230 A2 | 7/2007 |
| WO | 2007/088465 A2 | 8/2007 |
| WO | WO 2007/091831 A2 | 8/2007 |
| WO | WO-2007/128204 A1 | 11/2007 |
| WO | WO-2007/143916 A1 | 12/2007 |
| WO | WO-2008/024628 A2 | 2/2008 |
| WO | WO-2008042967 A2 | 4/2008 |
| WO | WO-2008/054112 A2 | 5/2008 |
| WO | WO-2008/097023 A1 | 8/2008 |
| WO | WO-2008/097030 A1 | 8/2008 |
| WO | WO 2008/100009 A1 | 8/2008 |
| WO | WO-2008/131401 A1 | 10/2008 |
| WO | WO-2008/155469 A1 | 12/2008 |
| WO | WO-2009/005429 A1 | 1/2009 |
| WO | WO-2009/023470 A2 | 2/2009 |
| WO | WO 2009/086188 A2 | 7/2009 |
| WO | WO-2009/088858 A1 | 7/2009 |
| WO | WO 2009/096195 A1 | 8/2009 |

OTHER PUBLICATIONS

3GPP TS 36.523-1, V8.0.0 (Dec. 2008), 3rd Generation Partnership Project, Technical Specification Group Radio Access Network, Evolved Universal Terrestrial Radio Access (E-UTRA) and Evolved Packet Core (EPC), User Equipment (UE) Conformance Specification, Part 1: Protocol Conformance Specification, Release 8, 497 pages.

LG Electronics Inc., "Correction to MAC PDU Format for Random Access Response," 3GPP TSG-RAN2 Meeting #62bis, R2-083370, Change Request 36.321, Version 8.x.0, Jun. 30-Jul. 4, 2008, Warsaw, Poland, 4 pages.

3GPP TS 36.321 V8.3.0 "3rd Generation Partnership Project; Technical Specification Group Radio Access Network; Evolved Universal Terrestrial Radio Access (E-UTRA) Medium Access Control (MAC) Protocol Specification (Release 8)", Sep. 2008, 36 pages.

(56) References Cited

OTHER PUBLICATIONS

Huawei, "Corrections to Random Access Procedure," 3GPP TSG-RAN WG 2 Meeting #64, R2-0087042, Change Request 36.321 CR-189 Rev., Version 8.3.0, Nov. 10-14, 2008, Prague, Czech Republic, 4 pages.
LG Electronics Inc., et al., "Reflection of RAN1 LS on Timing Adjust and Addition of MAC Padding in Random Access Response," 3GPP TSG-RAN2 Meeting #64, R2-086374, Change Request 36.321 CR 0128r1 Rev Version 8.3.0, Nov. 10-14, 2008, Prague, Czech Republic, 7 pages.
Ericsson, "Correction to UE transmission power headroom report for LTE", R2-083897, pp. 18-22, May 2008, Including 3GPP "Change Request", TSG-RAN2 36.321 V8.2.0, R2-083897, Meeting #63, Jeju Island, Korea, May 18-22, 2008.
ETSI TS 136 300 V8.4.0. "Evolved Universal Terrestrial Radio Access (E-UTRA) and Evolved Universal Terrestrial Radio Access (E-UTRAN); Overall description; Stage 2", 3GPP TS 36.300, Version 8.4.0 Release 8, Apr. 2008.
LG Electronics Inc. et al., "Counter Proposal to R2-090969 on Managment for HARQ Buffer with TAT," 3GPP TSG-RAN2 Meeting #65, R2-091232, Feb. 9-13, 2009, Athens, Greece, 3 pages.
LG Electronics Inc., "Management for HARQ Buffer with TAT," 3GPP TSG-RAN2 Meeting #65, R2-090969, Feb. 9-13, 2009, Athens, Greece, 2 pages.
Nokia Corporation et al., "Message 3 Definition," 3GPP TSG-RAN2 Meeting #64, R2-086077, Oct. 10-14, 2008, Prague, Czech Republic, 8 pages.
Dahlman et al., "3G Evolution: HSPA and LTE for Mobile Broadband," Elsevier, Edition 2, 2008, pp. 441, Cover page, and, p. 441.
LG Electronics Inc., "Correction to RACH Procedure," 3GPP TSG-RAN2, Meeting #64, R2-087070, Change Request, 36.321 CR 157, Rev. 1, Version 8.3.0, Prague, Czech Republic, Nov. 10-14, 2008, 6 pages.
3GPP "Medium Access Control (MAC) Protocol Specification (Release 8)", TS 36.321 V8.1.0 (Mar. 2008).
3GPP, "Evolved Universal Terrestrial Radio Access (E-UTRA)", TS 36.321 V8.1.0 (Mar. 2008).
3GPP Draft; R2-081035 LTE RACH__M2__V1, 3rd Generation Partnership Project (3GPP), Mobile Competence Centre; 650, Route Des Lucioles; F=06921 Sophia-Antipolis Cedex; France, vol. RAN WG2, No. Sorrento, Italy; Feb. 5, 2008, XP050138825.
3GPP Draft; R2-0810189 LTE__RA__BO__RO, 3GPP, Mobile Competence Centre, 650, Route Des Lucioles; F-06921 Sophia-Antipolis Cedex; France, vol. RAN WG2, No. Sevilla, Spain, Jan. 7, 2008, XP050138064, R2-080189.
NTT Docomo et al: "RA response format" 3GPP Draft; R2-080451, 3GPP, Mobile Competence Centre; 650, Route Des Lucioles; F-06921 Sophia-Antipolis Cedex; France, vol. RAN WG2, No. Sevilla, Spain; Jan. 8, 2008, XP050138299.
LG Electronics Inc: "Missing condition for unsuccessful reception of Msg2" 3GPP Draft; R2-090323 Proposed CR to 36.321 on Missing Condition for Unsuccessful Reception of MSG2, 3GPP, Mobile Competence Centre; 650, Route Des Lucioles; F-06921 Sophia-Antipolis Cedex, France, No. Ljubljana; Jan. 6, 2009, XP050322312.
MAC Rapporteurs (Quamcomm Europe et al: "E-UTRA MAC protocol specification update" 3GPP Draft; R2-081389 CR0001 to 36321-800, 3GPP, Mobile Competence Centre; 650, Route des Lucioses; F-06921 Sophia-Antipolis cedex; France, vol. RAN WG2, Sorento, Italy, Feb. 23, 2008, XP050139110.
Panasonic: "Clarification on a Active Time a definition" 3GPP Draft; R2-082225, 3GPP, Mobile Competence Centre; 650, Route des Lucioles; F-06921 Sophia-antipolis cedex, France, vol. RAN WG2, No. Kansas City, USA; Apr. 29, 2008, XP050139994.
3GPP Draft: R2-0802509 Restriction to PDCCH for Contention Resolution RO, 3GPP, Mobile Competence Centre; 650, Route des Lucioses; F-06921 Sophia-Antipolis cedex; France, vol. RAN WG2, No. Kansas City, USA; Apr. 29, 2008, pp. 1-2, XP050140190, R2-082509.

3GPP Draft; R2-074787__DL__Grant_MSG2__RO, 3GPP, Mobile Competence Centre; 650, Route des Lucioses; F-06921 Sophia-Antipolis cedex; France, vol. RAN WG2, No. Jeju:Nov. 5, 2007, Oct. 20, 2007, pp. 1-3, XP050137299.
"Evolved Universal Terrestrial Radio Access (E-UTRA) and Evolved Universal Terrestrial Radio Access (E-UTRAN); Overall description: Stage 2 (3GPP TS 36.300 version 8.4.0 Release 8); ETSI TS 136 300" ETSI Standards, LIS, Sophia antipolis cedex, France, vol. 3-R2, No. V8.4.0, (Apr. 1, 2008), XP014041816.
Sunplus Mmobile Inc: "Align the DRX Active Time with RA procedure" 3GPP Draft; R2-083428, 3GPP, Mobile Competence Centre; 650, Route des Lucioses; F-06921 Sophia-Antipolis cedex; France, vol. RAN WG2, No. Warsaw, Poland, Jun. 23, 2008, XP050140819.
LG Electronics Inc: "Correction to DRX" 3GPP Draft; R2-083274 Proposed CR to 36.321 [REL-8] Correction to DRX, 3GPP, Mobile Competence Centre; 650, Route des Lucioses; F-06921 Sophia-Antipolis cedex; France, vol. RAN WG2, No. Warsaw, Poland; Jun. 23, 2008, XP050140694.
MAC Rapporteurs (Qualcomm Europe et al: "E-UTRA MAN protocol specification update" 3GPP Draft; R2-081719 E-UTRA MAC Protocol Specification Update (CR), 3rd Generation Partnership Project (3GPP), Mobile Competence Centre; 650, Route des Lucioses; F-06921 Sophia-Antipolis cedex; France, vol. RAN WG2, No. Shenzhen, China; Mar. 25, 2008, XP050139431.
LG Electronics: "Corrections to the Random Access Response reception" 3GPP Draft; R2-082447 LTE-RACH_RESP_RO, 3GPP, Mobile Competence Centre; 650, Route Des Lucioles; F-06921 Sophia-Antipolis Cedex; France, vol. RAN WG2, No. Kansas City, USA: Apr. 28, 2008, XP050140134.
LG Electronics Inc: "Correction to RACH Procedure" 3GPP Draft; R2-086137 [REL-8] Proposed CR to 36.321 Correction to RACH Procedure, 3rd Generation Partnership Project (3GPP) Mobile Competence Centre; 650, Route des Lucioses; F-06921 Sophia-Antipolis cedex; France, No. Prague, Czech Republic; Nov. 10, 2008, pp. 1-6, XP050321188.
Handover Failure Handling, 3GPP Draft; R2-081054, -3rd Generation Partnership Project (3GPP), Mobile Competence Centre; 65, route des Lucioles; F-06921 Sophia-Antipolis Cedex; France, Feb. 4, 2008.
Ghosh et al., "Random Access Design for UMTS Air-Interface Evolution," IEEE 65th Vehicular Technology Conference, Apr. 22, 2007, pp. 1041-1045.
3GPP TS 36.321 V8.2.0(May 2008); Technical Specification Group Radio Access Network; Evolved Universal Terrestrial Radio Access (E-UTRA) Medium Access Control (MAC) protocol specification (Release 8), p. 1-33.
Panasonic: "Priority handling of MAC Control Elements" Internet Citation, May 5, 2008, XP002537451.
MAC Rapporteurs (Qualcomm Europe et al: "36.321 CR covering agreements of RAN2 #61bis and RAN2#62"); R2-082902, XP050140449, May 2008.
"BSR priority" 3GPP Draft, R2-081589 BSR Priority, 3GPP, Mobile Competence centre; 650, Route des Lucioles; F-06921 Sophia-Antipolis cedex; France. RAN WG2, No. Shenzhen, China; Mar. 24, 2008, XP050139321.
Infineon: "TP for the UL Logical channel prioritization" 3GPP Mobile Competence centre; 650, Route des Lucioles; F-06921 Sophia-Antipolis cedex; France, vol. RAN WG2, No. Kansas City, WAS, Apr. 29, 2008, XP050140185, R2-082504.
LG Electronics Inc: "Correction to Multiplexing Procedure for BSR" 3GPP Draft; R2-083275, 3GPP, vol. RAN WG2, No. Warsaw, Poland: May 23, 2008, XP050140695.
3GPP Draft; R2-082049 See whole document esp. section 5.1 and subsections thereof and subsections 5.4.3.1 and 5.4.3.2, Mar. 2008, XP 050139679.
3GPP Draft; R2-091633cr273r1-R2-090988, See whole document esp. subsections 5.4.3.1 and 5.4.3.2 Feb. 2009, XP 050323507.
Alcatel-Lucent: "TP on Power Headroom reporting" 3GPP Draft; R2-082224__PH Text Proposal, 3GPP Mobile Competence centre: 650, Route des Lucioles; F-06921 Sophia-Antipolis cedex; France, vol. RAN WG2, No. Kansas City, USA; Apr. 28, 2008, XP050139993.

(56) References Cited

OTHER PUBLICATIONS

Nokia Siemens Networks: "Power Headroom Reporting" Internet Citation, May 5, 2008, pp. 1-4, XP002537452, R2-082197.
Ericsson: "UE transmission power headroom report for LTE" 3GPP TSG RAN WG2 #62, R2-082147, May 5, 2008, pp. 1-4, XP002539839 (Aug. 4, 2009).
Nokia Siemens Networks et al: "Triggers for Power Headroom Reports in EUTRAN Uplink" 3GPP Draft; R1-080947, 3GPP, Mobile Competence centre: 650, Route des Lucioles; F-06921 Sophia-Antipolis cedex; France, vol. RAN WG1, No. Sorrento, Italy; Feb. 5, 2008, XP050109419.
Nokia: "Scheduling Information for E-UTRAN Uplink" Oct. 8, 2007-Oct. 12, 2007, vol. TSG-RAN WG2 Meeting #59BIS, No. R2-073909, pp. 1-3, Oct. 2007, XP002522064.
Ericsson et al., "Prioritization of MAC control elements", 3GPP TSG-RAN WG2 Meeting #64, Nov. 10-14, 2008, R2-087413, 3 pages.
Huawei, "Discussion of Message 3", 3GPP TSG RAN2 #60bis, Jan. 14-18, 2008, R2-080239, pp. 1-3.

\* cited by examiner

RANDOM ACCESS SCHEME FOR PREVENTING UNNECESSARY RETRANSMISSION AND USER EQUIPMENT FOR THE SAME

This application is the National Phase of PCT/KR2010/000036 filed on Jan. 5, 2010, which claims priority under 35 U.S.C. 119(e) to U.S. Provisional Application No. 61/142,613 filed on Jan. 5, 2009 and under 35 U.S.C. 119(a) to Patent Application No. 10-2009-0130622 filed in Korea on Dec. 24, 2009, all of which are hereby expressly incorporated by reference into the present application.

BACKGROUND OF THE INVENTION

1. Field of the Invention

The present invention relates to a random access scheme of a user equipment in a mobile communication system, and more particularly, to a random access scheme for preventing unnecessary retransmission and a user equipment for the same.

2. Discussion of the Related Art

As an example of a mobile communication system to which the present invention is applicable, a $3^{rd}$ Generation Partnership Project Long Term Evolution (3GPP LTE) communication system will be schematically described.

FIG. 1 is a schematic diagram of an Evolved Universal Mobile Telecommunications System (E-UMTS) network architecture as an example of a mobile communication system.

The E-UMTS is an evolved version of the existing UMTS and basic standardization thereof is in progress under the 3GPP. The E-UMTS is also referred to as a Long Term Evolution (LTE) system.

The E-UMTS network may be roughly divided into an Evolved UMTS Terrestrial Radio Access Network (E-UTRAN) 101 and a Core Network (CN) 102. The E-UTRAN 101 generally comprises a terminal (i.e., User Equipment (UE)) 103, a base station (i.e., eNode B or eNB) 104, an Access Gateway (AG) 105 that is located at an end of the E-UMTS network and connects with one or more external networks. The AG 105 may be divided into a part for processing user traffic and a part for handling control traffic. Here, an AG for processing new user traffic and an AG for processing control traffic can communicate with each other using a new interface.

One eNode B may have one or more cells. An interface for transmitting the user traffic or the control traffic may be used among the eNode Bs. The CN 102 may comprise an AG 105, nodes for user registration of other UEs 103, and the like. An interface may be used to distinguish the E-UTRAN 101 and the CN 102 from each other.

The various layers of the radio interface protocol between the terminal and the network may be divided into Layer (L1), Layer 2 (L2) and Layer 3 (L3), based upon the lower three layers of the Open System Interconnection (OSI) standard model that is well-known in the field of communications systems. Among these layers, Layer 1 (L1), namely, the physical layer, provides an information transfer service by using a physical channel, while a Radio Resource Control (RRC) layer located in Layer 3 (L3) performs the function of controlling radio resources between the terminal and the network. The RRC layer exchanges RRC messages between the terminal and the network. The RRC layer may be located by being distributed in network nodes such as the eNode B 104, the AG 105, and the like, or may be located only in the eNode B 104 or the AG 105.

FIGS. 2 and 3 show an architecture of a radio interface protocol between a terminal and a UTRAN according to the 3GPP radio access network standard.

The radio interface protocol shown in FIGS. 2 and 3 is horizontally composed of a physical layer, a data link layer, and a network layer, and is vertically composed of a user plane for transmitting user data and a control plane for transferring control signaling. In detail, FIG. 2 shows the layers of the radio protocol control plane and FIG. 3 shows the layers of the radio protocol user plane. The protocol layers of FIGS. 2 and 3 may be divided into L1 (Layer 1), L2 (Layer 2), and L3 (Layer 3) based upon the lower three layers of the Open System Interconnection (OSI) standard model that is widely known in the field of communication systems.

Hereinafter, particular layers of the radio protocol control plane of FIG. 2 and the radio protocol user plane of FIG. 3 will be described.

The physical layer (PHY) (Layer 1) provides an information transfer service to an upper layer using a physical channel. The PHY layer is connected to a Medium Access Control (MAC) layer located thereabove via a transport channel, and data is transferred between the PHY layer and the MAC layer via the transport channel. At this time, the transfer channel is roughly divided into a dedicated transfer channel and a common transfer channel depending on whether or not a channel is shared. In addition, data is transferred respectively between different physical layers, namely, between the respective physical layers of the transmitting side and the receiving side via a physical channel using radio resources.

Various layers are located in Layer 2. First, the Medium Access Control (MAC) layer maps various logical channels to various transfer channels and performs a logical channel multiplexing function for mapping various logical channels to one transfer channel. The MAC layer is connected to a Radio Link Control (RLC) layer which is an upper layer via a logical channel, and the logical channel may be roughly divided into a control channel for transmitting information about the control plane and a traffic channel for transmitting information about the user plane, according to the type of transmitted information.

The RLC layer of the second layer segments and concatenates data received from an upper layer, thereby controlling a data size so as to be suitable for a lower layer to transmit data to a radio interval. The RLC provides three modes, namely, a transparent mode (TM), an unacknowledged mode (UM) and an acknowledged Mode (AM) to support various QoSs requested by each radio bearer (RB). Especially, for reliable data transmission, the AM RLC performs a function to retransmit data through an automatic repeat request (ARQ).

A packet data convergence protocol (PDCP) layer located at the second layer is used to efficiently transmit IP packets, such as IPv4 or IPv6, on a radio interval with a relatively narrow bandwidth. For this purpose, the PDCP layer reduces the size of an IP packet header which is relatively great in size and includes unnecessary control information, namely, performs a function called header compression. Accordingly, only necessary information can be included in the header part of data for transmission, so as to increase a transmission efficiency of a radio interval. In the LTE system, the PDCP layer also performs a security function. The security function includes a ciphering function for preventing data monitoring from a third party, and an integrity protection function for preventing data manipulation from a third party.

A radio resource control (RRC) layer located at a highest portion of the third layer is defined in the control plane. The RRC layer handles logical channels, transport channels and physical channels for the configuration, re-configuration and release of radio bearers. Here, a radio bearer (RB) denotes a logical path provided by the first and second layers of radio protocols for data transfer between the terminal and the UTRAN. Generally, configuration of the RB indicates a process of regulating radio protocol layers and channel characteristics necessary for providing a specific service, and configuring specific parameters and operation methods. The RB is divided into a signaling RB (SRB) and data RB (DRB). The SRB is used as a path through which an RRC message is transmitted on a C-plane, while the DRB is used as a path through which user data is transmitted on a U-plane.

Downlink transport channels for transmitting data from a network to a terminal may include a Broadcast Channel (BCH) for transmitting system information and a downlink Shared Channel (SCH) for transmitting other user traffic or control messages. Traffic or control messages of a downlink multicast or broadcast service may be transmitted either via a downlink SCH, or via a separate downlink Multicast Channel (MCH). In addition, uplink transport channels for transmitting data from a terminal to a network may include a Random Access Channel (RACH) for transmitting an initial control message and an uplink Shared Channel (SCH) for transmitting user traffic or control messages.

Downlink physical channels for transmitting information transferred to a downlink transport channel via a radio interval between a network and a terminal may include a Physical Broadcast Channel (PBCH) for transmitting BCH information, a Physical Multicast Channel (PMCH) for transmitting MCH information, a Physical Downlink Shared Channel (PDSCH) for transmitting PCH information and downlink SCH information, and a Physical Downlink Control Channel (PDCCH) (also called a DL L1/L2 control channel) for transmitting control information sent from the first and second layers, such as downlink or uplink radio resource allocation information (DL/UL Scheduling Grant) or the like. Uplink physical channels for transmitting information transferred to an uplink transport channel via a radio interval between a network and a terminal may include a Physical Uplink Shared Channel (PUSCH) for transmitting uplink SCH information, a Physical Random Access Channel (PRACH) for transmitting RACH information, and a Physical Uplink Control Channel (PUCCH) for transmitting control information sent from the first and second layers, such as HARQ ACK or NACK, Scheduling Request (SR), Channel Quality Indicator (CQI) report and the like.

The HARQ operation performed in the LTE system based on the above description will now be described.

FIG. 4 is a diagram showing a HARQ operation performed in the LTE system.

In FIG. 4, description will be given in an uplink state in which a UE is a transmission side, a base station (eNode B or eNB) is a reception side, and HARQ feedback information is received from the base station, but may be equally applied to downlink transmission.

First, the eNB may transmit uplink scheduling information, that is, uplink grant (UL grant), via a Physical Downlink Control channel (PDCCH), in order to enable the UE to transmit data using the HARQ scheme (S401). The UL grant may include a UE identifier (e.g., C-RNTI, semi-persistent scheduling C-RNTI), a location of an assigned radio resource (resource block assignment), a transmission parameter such as a modulation/coding rate, a redundancy version and the like, a new data indicator (NDI), etc.

The UE may check UL grant information sent to itself by monitoring a PDCCH in each Transmission Time Interval (TTI). In case of discovering the UL grant information sent to itself, the UE may transmit data (data 1 in FIG. 4) via a physical uplink shared channel (PUSCH) according to the received UL grant information (S402). In this case, the transmitted data can be transmitted by a MAC Protocol Data Unit (PDU).

As described above, after the UE has performed the uplink transmission via the PUSCH, the UE waits for reception of HARQ feedback information via a Physical Hybrid-ARQ Indicator Channel (PHICH) from the eNB. If HARQ NACK for the data 1 is transmitted from the eNB (S403), the UE retransmits the data 1 in a retransmission TTI of the data 1 (S404). On the contrary, if HARQ ACK is received from the eNB (not shown), the UE stops the HARQ retransmission of the data 1.

Each time the UE performs one data transmission using the HARQ scheme, the UE takes a count of the number of transmissions (CURRENT_TX_NB). If the transmission number reaches a maximum transmission number (CURRENT_TX_NB) set by an upper layer, the UE discards the MAC PDU stored in a HARQ buffer.

If the HARQ ACK for the data 1 retransmitted in the step S404 from the UE is received (S405) and if a UL grant is received via the PDCCH (S406), the UE may determine whether data to be transmitted this time is an initially-transmitted MAC PDU or whether to retransmit a previous MAC PDU using a new data indicator (NDI) field received via the PDCCH. In this case, the NDI field is a 1-bit field. The NDI field is toggled as 0→1→0→1→ . . . each time a new MAC PDU is transmitted. For the retransmission, the NDI field is set to a value equal to that of the initial transmission. In particular, the UE may determine whether to retransmit the MAC PDU, by comparing the NDI field with a previously transmitted value.

In case of FIG. 4, as a value of NDI=0 in the step S401 is toggled into NDI=1 in the step S406, the UE recognizes that the corresponding transmission is a new transmission. The UE may transmit data 2 via a PUSCH (S407).

Meanwhile, a procedure of, at a UE, performing random access to an eNB will now be described.

First, the UE may perform a random access procedure in the following cases:
  when the UE performs initial access because there is no RRC Connection with the eNB,
  when the UE initially accesses a target cell in a handover procedure,
  when the random access procedure is requested by a command of a base station,
  when there is uplink data transmission in a situation where uplink time synchronization is not aligned or where a specific radio resource used for requesting radio resources is not allocated, and
  when a recovery procedure is performed in case of a radio link failure or a handover failure.

In the LTE system, there are two procedures in selecting a random access preamble: one is a contention based random access procedure in which the UE randomly selects one preamble within a specific group for use, another is a non-contention based random access procedure in which the UE uses a random access preamble allocated only to a specific UE by the eNB. The non-contention based random access procedure may be used, as described above, only in the handover procedure or when it is requested by the command of the eNB.

Meanwhile, a procedure in which a UE performs random access to a specific eNB may include steps of (1) at the UE, transmitting a random access preamble to the eNB (hereinafter, referred to as a "first message (Message 1)" transmission step), receiving a random access response from the eNB in correspondence with the transmitted random access preamble (hereinafter, referred to as a "second message (Message 2)" reception step), (3) transmitting an uplink message using information received by the random access response message (hereinafter, referred to as a "third message (Message 3)" transmission step), and (4) receiving a message corresponding to the uplink message from the eNB (hereinafter, referred to as a "fourth message (Message 4)" reception step).

FIG. 5 shows an operation procedure between a UE and an eNB in a contention based random access procedure.

(1) First Message (Message 1) Transmission

First, a UE may randomly select a random access preamble within a group of random access preambles indicated through system information or a handover command, may select PRACH resources capable of transmitting the random access preamble, and then may transmit the selected random access preamble (Step 501).

(2) Second Message (Message 2) Reception

After transmitting the random access preamble in step S501, the UE may attempt to receive a response with respect to its random access preamble within a random access response reception window indicated through the system information or the handover command by the eNB (Step S502). More specifically, the random access response information is transmitted as a MAC PDU, and the MAC PDU may be transferred via the Physical Downlink Shared Channel (PDSCH). In addition, the Physical Downlink Control Channel (PDCCH) may be monitored such that the terminal appropriately receives information transferred via the PDSCH. That is, the PDCCH may include information about a UE that should receive the PDSCH, frequency and time information of radio resources of the PDSCH, a transfer format of the PDSCH, and the like. Here, if the PDCCH has been successfully received, the UE may appropriately receive the random access response transmitted via the PDSCH according to information of the PDCCH. The random access response may include a random access preamble identifier (ID) (e.g., Random Access Preamble Identifier (RAPID)), a UL Grant indicating uplink resources, a temporary C-RNTI, a Time Advance Command (TAC), and the like.

Here, the random access preamble identifier is included in the random access response in order to notify UEs to which information such as the UL Grant, the temporary C-RNTI, and the TAC would be valid because one random access response may include random access response information for one or more UEs. Here, it is assumed that the random access preamble identifier may be identical to the random access preamble selected by the UE in Step 502. Accordingly, the UE may receive the UL Grant, the temporary C-RNTI and the TAC.

(3) Third Message (Message 3) Transmission

If the UE has received the random access response valid to the UE itself, the UE may process each of the information included in the random access response. That is, the UE applies the TAC, and stores the temporary C-RNTI. In addition, data to be transmitted may be stored in a Message 3 buffer in correspondence with the reception of the valid random access response.

In addition, the UE uses the received UL Grant so as to transmit data (that is, Message 3) to the eNB (Step S503). Message 3 should be included in the identifier of the UE. This is because, in the contention based random access procedure, the eNB may not determine which UEs are performing the random access procedure, but later the UEs should be identified for contention resolution.

Here, two different schemes may be provided to include the UE identifier. A first scheme is to transmit the UE's cell identifier through an uplink transmission signal corresponding to the UL Grant if the UE has already received a valid cell identifier allocated in a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a Contention Resolution (CR) timer.

(4) Fourth Message (Message 4) Reception

After transmitting the data with its identifier through the UL Grant included in the random access response, the UE waits for an indication (instruction) of the eNB for the contention resolution. That is, the UE attempts to receive the PDCCH so as to receive a specific message (Step 504). Here, there are two schemes to receive the PDCCH. As described above, if the UE identifier included in Message 3 transmitted in correspondence with the UL Grant is the cell identifier, the UE attempts to receive the PDCCH by using its own cell identifier. If the UE identifier included in Message transmitted in correspondence with the UL Grant is its unique identifier, the UE attempts to receive the PDCCH by using the temporary C-RNTI included in the random access response. Thereafter, for the former, if the PDCCH is received through its cell identifier before the contention resolution timer expires, the UE determines that the random access procedure has been successfully (normally) performed, thus completing the random access procedure. For the latter, if the PDCCH is received through the temporary cell identifier before the contention resolution timer expires, the UE checks data transferred by the PDSCH that the PDCCH indicates. If the unique identifier of the UE is included in the data, the UE determines that the random access procedure has been successfully (normally) performed, thus completing the random access procedure.

Meanwhile, if the contention resolution procedure through the transmission of Message 3 and the reception of Message 4 has not been successfully performed, the UE may select another random access preamble so as to restart the random access procedure. To this end, the UE may receive Message 2 from the eNB, configure Message 3 for contention resolution procedure, and transmit Message 3 to the eNB. The HARQ process used for the transmission of Message 3 in the HARQ system which was described with reference to FIG. 4 may be different from the HARQ process for the transmission of Message 3 in the previous random access attempt. In this case, there may be a problem in which the MAC PDU stored in the HARQ buffer corresponding to the previous HARQ process may be unnecessarily retransmitted. The present inventors provide a technology for recognizing and solving the above problem.

SUMMARY OF THE INVENTION

Accordingly, the present invention is directed to a random access scheme for preventing unnecessary data retransmission and a user equipment for the same that substantially obviate one or more problems due to limitations and disadvantages of the related art.

An object of the present invention is to provide a random access scheme for preventing unnecessary data retransmission and a user equipment for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing random access to a base station by a terminal includes transmitting a random access preamble to the base station; receiving, from the base station in response to the random access preamble, random access response message including uplink grant information; and storing a Medium Access Control Packet Data Unit (MAC PDU) including uplink data and an identifier of the terminal in a message 3 (Msg3) buffer in response to the uplink grant information; copying the MAC PDU stored in the Msg3 buffer to a first Hybrid Automatic Repeat Request (HARQ) buffer associated with a first HARQ process; transmitting the MAC PDU stored in the first HARQ buffer to the base station using the first HARQ process; starting or restarting a Contention Resolution (CR) timer; receiving, from the base station, a Physical Downlink Control Channel (PDCCH) signal; and flushing the first HARQ buffer, if the received PDCCH signal or a Physical Downlink Shared Channel (PDSCH) signal associated with the received PDCCH signal does not match the identifier of the terminal or if the CR timer expires.

The terminal may consider a contention resolution as not successful, if the received PDCCH signal or a physical downlink shared channel (PDSCH) signal associated with the received PDCCH signal does not match the identifier of the terminal or if the CR timer expires.

The terminal may stop a Timing Alignment Timer (TAT), when the terminal considers the contention resolution as not successful. The terminal may flush the first HARQ buffer, when the TAT expires or is stopped.

The identifier of the terminal may be one of a Cell-Radio Network Temporary Identifier (C-RNTI) of the terminal or a UE contention resolution identity of the terminal.

The terminal may consider the contention resolution as not successful, when the terminal has transmitted the MAC PDU including the C-RNTI of the terminal and the received PDCCH signal is not addressed to the C-RNTI of the terminal. Alternatively, the terminal may consider the contention resolution as not successful, when the terminal has transmitted the MAC PDU including the UE contention resolution identity of the terminal and the PDSCH signal associated with the received PDCCH signal does not match the UE contention resolution identity of the terminal.

The method may further include retransmitting the selected random access preamble to the base station according to the failure of the contention resolution, receiving a random access response message including a Timing Alignment Command (TAC) from the base station, starting or restarting a Timing Alignment Timer (TAT) according to the reception of the TAC; copying the MAC PDU stored in the Msg3 buffer to a second HARQ buffer associated with a second HARQ process, and transmitting the MAC PDU stored in the second HARQ buffer to the base station using the second HARQ process, and the terminal according to the present embodiment may not transmit the MAC PDU stored in the first HARQ buffer even when the TAT is started or restarted.

In another aspect of the present invention, a terminal includes a physical layer module including a transmission module configured to transmit a random access preamble to a base station, and a reception module configured to receive a random access response message including uplink grant information from the base station; and a Medium Access control (MAC) layer module including a multiplexing and assembly entity configured to configure a Medium Access Control Packet Data Unit (MAC PDU) including uplink data and an identifier of the terminal according to the uplink grant information received by the reception module, a message 3 (Msg3) buffer configured to store the MAC PDU configured by the multiplexing and assembly entity according to the reception of the random access response message, a plurality of Hybrid Automatic Repeat Request (HARQ) process modules and a plurality of HARQ buffers associated with the plurality of HARQ process modules, and a HARQ entity configured to control operations of the plurality of HARQ process modules, wherein the MAC layer module copies the MAC PDU stored in the Msg3 buffer to a first HARQ buffer associated with a first HARQ process according to the reception of the random access response message by the reception module, controls the MAC PDU stored in the first HARQ buffer to be transmitted to the base station using the first HARQ process, and starts or restarts a Contention Resolution (CR) timer when transmitting the MAC PDU stored in the first HARQ buffer, and wherein, if reception of a Physical Downlink Control Channel (PDCCH) signal from the base station is reported from the physical layer module, is the MAC layer module determines whether the PDCCH or a Physical Downlink Shared Channel (PDSCH) signal associated with the PDCCH signal matches the identifier of the terminal or whether the CR timer expires, and flushes the first HARQ buffer if the PDCCH signal or the PDSCH signal associated with the PDCCH signal does not match the identifier of the terminal or if the CR timer expires.

The MAC layer module may consider a contention resolution as not successful, if the received PDCCH signal or the PDSCH signal associated with the received PDCCH signal does not match the identifier of the terminal or if the CR timer expires.

The MAC layer module may stop a Timing Alignment Timer (TAT), when the terminal considers the contention resolution as not successful. The MAC layer module may flush the first HARQ buffer, when the TAT expires or is stopped.

The identifier of the terminal may be one of a Cell-Radio Network Temporary Identifier (C-RNTI) of the terminal or a UE contention resolution identity of the terminal. The MAC layer module may consider the contention resolution as not successful, when the terminal has transmitted the MAC PDU including the C-RNTI of the terminal and the received PDCCH signal is not addressed to the C-RNTI of the terminal.

The MAC layer module may consider the contention resolution as not successful, when the terminal has transmitted the MAC PDU including the UE contention resolution identity of the terminal and the PDSCH associated with the received PDCCH signal does not match the UE contention resolution identity of the terminal.

According to the present invention, it is possible to prevent unnecessary data retransmission during a random access procedure or after completing the random access procedure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
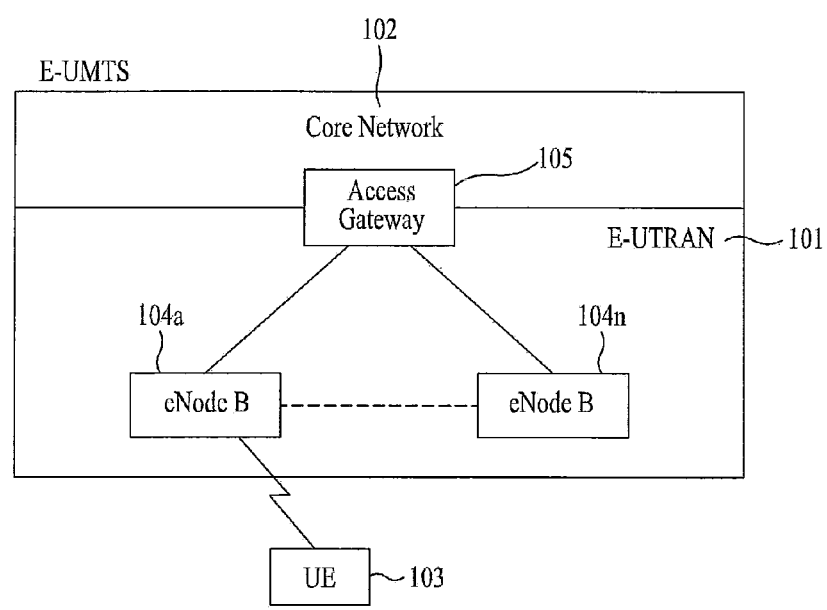
FIG. 1 is a schematic diagram of an Evolved Universal Mobile Telecommunications System (E-UMTS) network architecture as an example of a mobile communication system.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For instance, although the following detailed description is made on the assumption that a mobile communication system is the 3GPP LTE system, it is applicable to other prescribed mobile communication systems by excluding unique items of the 3GPP LTE.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal is a generic term for a mobile or fixed user-end device such as a user equipment (UE), a mobile station (MS) and the like. In addition, it is assumed that a base station is a generic name for any node of a network end, which communicates with a terminal, such as a Node B, an eNode B and the like.

As described above, the present invention provides a random access scheme for preventing unnecessary data retransmission in random access procedure and a User Equipment (UE) for the same. First, an uplink timing alignment maintenance scheme and a contention resolution procedure of the random access procedure will be described in detail.

Description of uplink timing alignment maintenance in an LTE system will be given. In the LTE system based on Orthogonal Frequency Division Multiplexing (OFDM) technology, there is possibility of interference between UEs during communication between UE and eNB. In order to minimize interference between UEs, it is important that the eNB manages or handles transmission timing of the UE. More particularly, the UE may be present in a random area within a cell, and this implies that a traveling time of data from the UE to the eNB can be varied based on a location of the UE. Namely, if a UE attempts to transmit data on an edge of the cell, data transmission time of this specific UE will be much longer than data transmission time of a UE located on a center of the cell. In contrast, if an UE is located at the center of the cell, data transmission time of this specific terminal will be much shorter than data transmission time of a UE located on the edge of the cell. The eNB must manage or handle all data or signals, which are transmitted by the UEs within the cell, within the boundary of each time in order to prevent interference between the UEs. Namely, the eNB must adjust or manage a transmission timing of the UEs according to the location condition of the UE, and such adjustment can be called timing alignment maintenance.

One of the methods for maintaining the timing alignment is a random access procedure. Namely, during the random access procedure, the eNB receives a random access preamble transmitted from the UE, and the eNB can calculate a time alignment (Sync) value using the received random access preamble. The calculated time alignment value can be notified to the UE by a random access response, and the UE can update the data transmission timing based on the calculated time alignment value.

In another method, the eNB may receive a sounding reference symbol (SRS) transmitted from the UE periodically or randomly, calculate the time alignment (Sync) value based on the SRS, and notify the UE of the time alignment value. Then, the terminal may update the data transmission timing.

As described above, the eNB may measure transmission timing of the UE though a random access preamble or SRS, and may notify the UE of an adjustable timing value. As described above, the time alignment (Sync) value transmitted from the eNB to the UE may be called a time advance command (hereinafter referred to as "TAC"). The TAC may be processed in a Medium Access control (MAC) layer. Since the UE does not have a fixed location, the transmission timing is frequently changed based on a UE's location and/or a UE's movement velocity. In consideration of this point, if the US receives the TAC from the eNB, it is assumed that the TAC is not valid for an infinite duration but is only valid for certain duration. A time alignment timer (TAT) is used for indicating or representing the certain duration. As such, the TAT is started when the UE receives the TAC from the eNB. It is assumed that the UE is time-synchronized with the eNB only during the operation of the TAT. The TAT value is transmitted to the US through a Radio Resource Control (RRC) signal such as system information (SI) or a radio bearer reconfiguration. In addition, if the US receives a new TAC from the eNB during an operation of the TAT, the TAT is restarted. Further, when the TAT is expired or not running, the UE determines that the US is not time-synchronized with the eNB and does not transmit any other uplink data or control signal except for the random access preamble.

Hereinafter, the method of contention resolution of the random access procedure will be described in detail.

The reason why contention occurs in the random access procedure is because the number of random access preambles is finite. That is, since the eNB cannot apply unique random access preambles of all UEs to the OEs, each of the UEs randomly selects one from common random access preambles and transmits the selected random access preamble. Accordingly, two or more UEs may select and transmit the same random access preamble via the same PRACH resources. In this case, the eNB determines that the received random access preamble is transmitted from one UE.

To this end, the eNB transmits a random access response to the UE and expects that one UE receives the random access response. However, as described above, since contention may occur, two or more UEs receive one random access response and thus perform respective operations according to the reception of the random access response. That is, the two or more UEs transmit different data via the same radio resources using one UL Grant included in the random access response.

Then, the transmission of the data by all the two or more UEs may fail or the eNB may receive only the data of a specific GE according to the locations or the transmission powers of the UEs. For the latter, since the two or more UEs determine that their data transmission is successfully performed, the eNB should notify the UEs which fail contention: of information about the failure. That is, the notification of the information about failure or success of the contention is called contention resolution.

The contention resolution method include two methods: one is a method of using a Contention Resolution (CR) timer and another is a method of transmitting an identifier of a UE, which successfully performs data transmission, to UEs.

The former method is used when the UE already has its unique cell identifier (C-RNTI) before the random access procedure. That is, the GE which already has the cell identifier transmits data including its cell identifier to the eNB according to the random access response and operates the CR timer. Then, when the UE receives PDCCH information included in its cell identifier before the CR timer expires, the UE determines that the UE itself succeeds in contention and normally completes the random access procedure. In contrast, if the UE does not receive the PDCCH including its cell identifier before the CR timer expires, the UE determines that the UE itself fails contention and performs the random access procedure again or notifies an upper layer of the failure.

The latter method of the contention resolution methods, that is, the method of transmitting the identifier of the UE which successfully performs data transmission, is used when the UE does not have its unique cell identifier before the random access procedure. That is, if the UE does not have its cell identifier, an identifier (e.g., S-TMSI or random ID) upper than the cell identifier is included in the data so as to be transmitted according to the UL Grant included in the random access response, and the UE operates the CR timer. If the data including its upper identifier is transmitted via a DL-SCH before the CR timer expires, the UE determines that the random access procedure is successfully performed. In contrast, if the data including its upper-identifier is not transmitted via the DL-SCH before the CR timer expires, the UE determines that the random access procedure fails.

The case where data is unnecessarily retransmitted during the random access procedure or after the random access procedure will be described in detail and the cause thereof will be defined.

Figure 6:
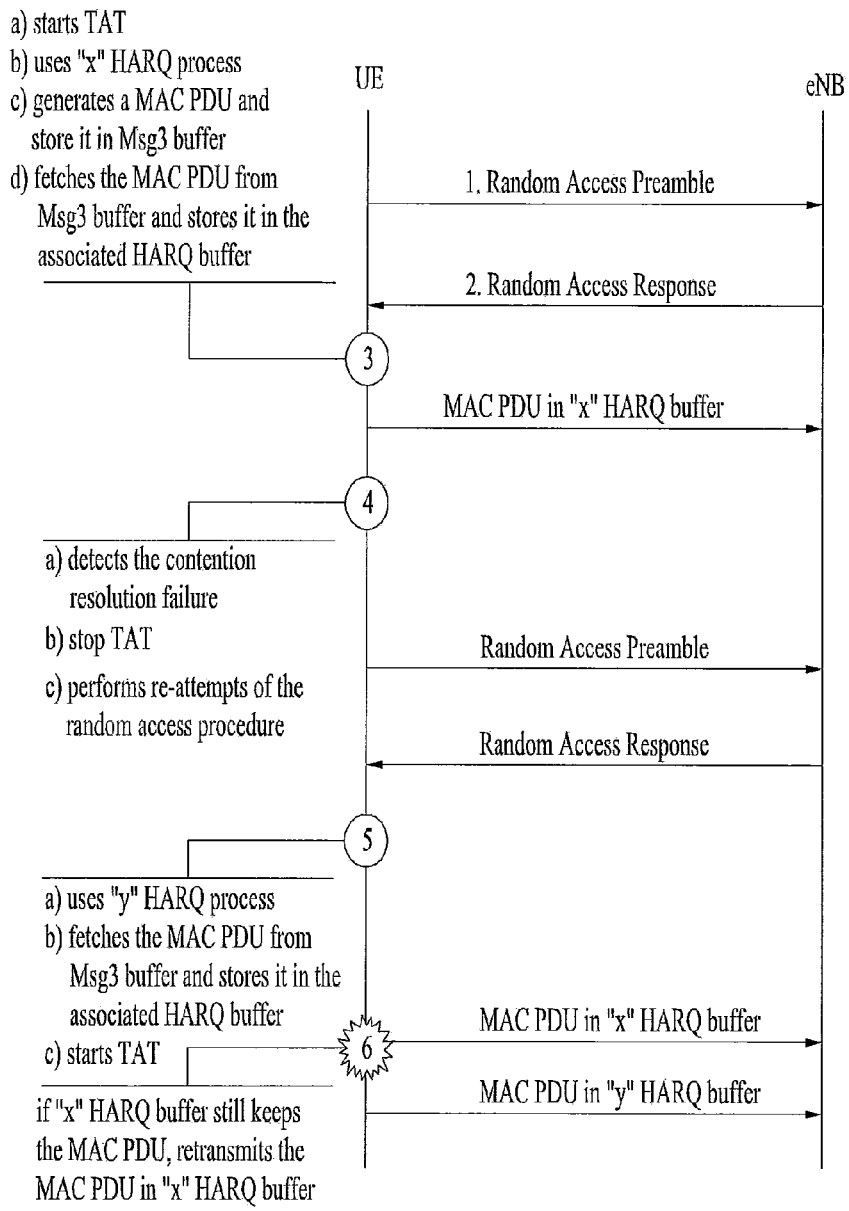
FIG. 6 is a diagram illustrating the case where a UE performs unintended HARQ retransmission, which is recognized by the present inventors.

FIG. 6 is a diagram illustrating the case where a UE performs unintended HARQ retransmission, which is recognized by the present inventors.

Step 1: The UE may transmit a random access preamble to an eNB in order to perform a contention based random access procedure.

Step 2: The eNB may transmit a random access response to the UE in response to the random access preamble.

Step 3: The UE may apply a TAC included in the random access response so as to start a TAT. In addition, the UE may generate a MAC PDU according to uplink scheduling information included in the random access response and store the MAC PDU in a Message 3 (Msg3) buffer. Then, the UE may fetch the MAC PDU from the Msg3 buffer, store the MAC PDU in a HARQ buffer associated with a specific HARQ process (an x HARQ process, in the present embodiment) of a plurality of HARQ processes, and transmit the MAC PDU stored in the HARQ buffer to the eNB at a transmission time point of the HARQ process.

Step 4: It is determined that the random access procedure fails by a specific condition as described above. Then, the UE stops the operation of the TAT. Then, the UE may transmit a random access preamble to the eNB and perform the subsequent necessary operation, in order to reattempt the random access procedure.

Step 5: The UE may transmit the random access preamble and receive a random access response from the eNB, in order to reattempt the random access procedure. In this case, the UE may apply a TAC included in the random access response so as to restart a TAT. In addition, the UE may fetch the MAC PDU from the Msg3 buffer and store the MAC PDU in a HARQ buffer associated with a specific HARQ process (a y HARQ process, in the present embodiment) of the plurality of HARQ processes and prepare for the transmission of the MAC PDU at a transmission time point of the HARQ process.

Step 6: During the operation of the TAT of the UE, the UE determines that an uplink time is synchronized, determines whether a MAC PDU is present in HARQ buffers corresponding to respective transmission time points corresponding to the plurality of HARQ processes (more particularly, eight HARQ processes in the LTE system), and transmits or retransmits the MAC PDU at a corresponding transmission time point if the MAC PDU is stored in corresponding HARQ buffer. Accordingly, if the MAC PDU is still stored in the HARQ buffer (x HARQ buffer) associated with the x HARQ process in Step 6 and the TAT of the UE is operated, the MAC PDU stored in the x HARQ buffer is retransmitted at the transmission time point corresponding to the x HARQ process, independent of the transmission of the MAC PDU stored in the HARQ buffer (y HARQ buffer) associated with the y HARQ process. However, the retransmission of the MAC PDU stored in the x HARQ buffer corresponds to unintended retransmission.

Since the HARQ process used when the UE restarts the random access procedure in the example associated with FIG. 6 may be different from a HARQ process used in a previous random access procedure, unnecessary data retransmission may occur as described above. Accordingly, in the embodiment of the present invention, in order to prevent the above-described unintended data retransmission, situations in which the random access procedure is restarted are checked and a HARQ buffer used in the previous transmission is flushed in subsequent procedures which will be performed in the respective situations, thereby preventing unnecessary retransmission.

Hereinafter, the cases of applying the method according to the present embodiment to the respective situations will be described.

First Embodiment

Figure 7:
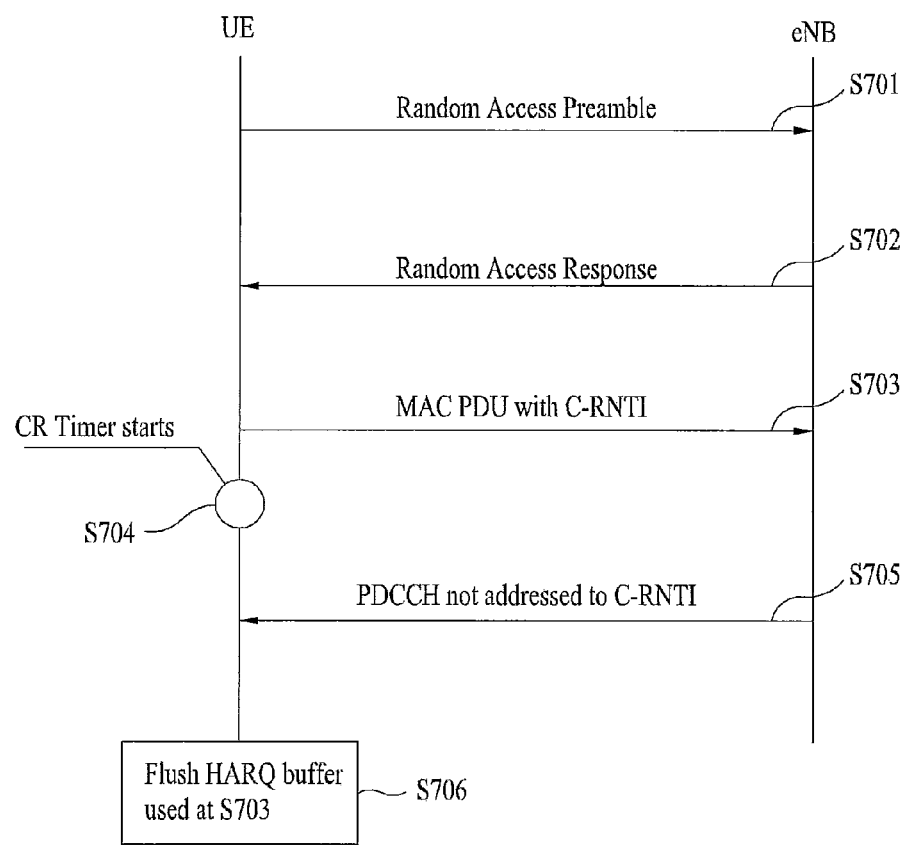
FIG. 7 is a diagram illustrating an operation of a UE which performs a random access procedure according to a first embodiment of the present invention.

FIG. 7 is a diagram illustrating an operation of a UE which performs a random access procedure according to a first embodiment of the present invention.

The UE may transmit a random access preamble to an eNB in order to perform the random access procedure (S701). In response to the transmission of the random access preamble, the eNB may transmit a random access response message to the UE (S702). The random access response message may include UL Grant for the transmission of Message 3 by the UE.

If the UE has a cell identifier (C-RNTI) determined with respect to the eNB in this state, the UE may configure a MAC PDU including the cell identifier (C-RNTI) of the UE and transmit the MAC PDU to the eNB as Message 3 in order to perform the contention resolution procedure. The MAC PDU of the UE is configured by multiplexing and assembly entity of a MAC layer, is stored in the Msg3 buffer, and is stored in a HARQ buffer of a specific HARQ process used for transmission of Message 3 again.

The UE which transmits Message 3 using the specific HARQ process may start a CR timer (S704). In the present embodiment, it is assumed that the UE receives a PDCCH signal from the eNB before the CR timer expires (S705). When the UE receives the PDCCH, and, more particularly, if the physical layer of the UE informs the MAC layer of the reception of the PDCCH, the UE according to the present embodiment determines whether the PDCCH signal is received using the cell identifier (C-RNTI) transmitted by Message 3 of the UE.

If the UE which transmits Message 3 including the cell identifier (C-RNTI) of the UE does not receive the PDCCH corresponding to its cell identifier, the UE may consider the contention resolution procedure as not successful and perform the subsequent operations according to the failure of the contention resolution procedure.

For example, the UE which considers the contention resolution procedure as not successful may (1) increase a random access preamble transmission counter (PREAMBLE_TRANSMISSION_COUNTER) by 1 and (2) determine whether the preamble transmission counter value reaches a maximum preamble transmission number (preambleTransMax+1). (3) If the preamble transmission counter value reaches the maximum preamble transmission number, a problem of the random access procedure may be reported to an upper layer. (4) If the preamble transmission counter value does not reach the maximum preamble transmission number, the UE may apply a back-off parameter so as to delay a subsequent random access preamble transmission time point and perform a process of selecting a new random access preamble.

Meanwhile, the UE according to the present embodiment is configured to perform an operation for flushing a HARQ buffer of a specific HARQ process used for transmission of Message 3 prior to the operation according to the failure of the contention resolution procedure. By flushing the HARQ buffer in the operation in which the UE considers the contention resolution procedure as not successful, the unnecessary retransmission described with respect to FIG. 6 can be prevented.

Second Embodiment

Figure 8:
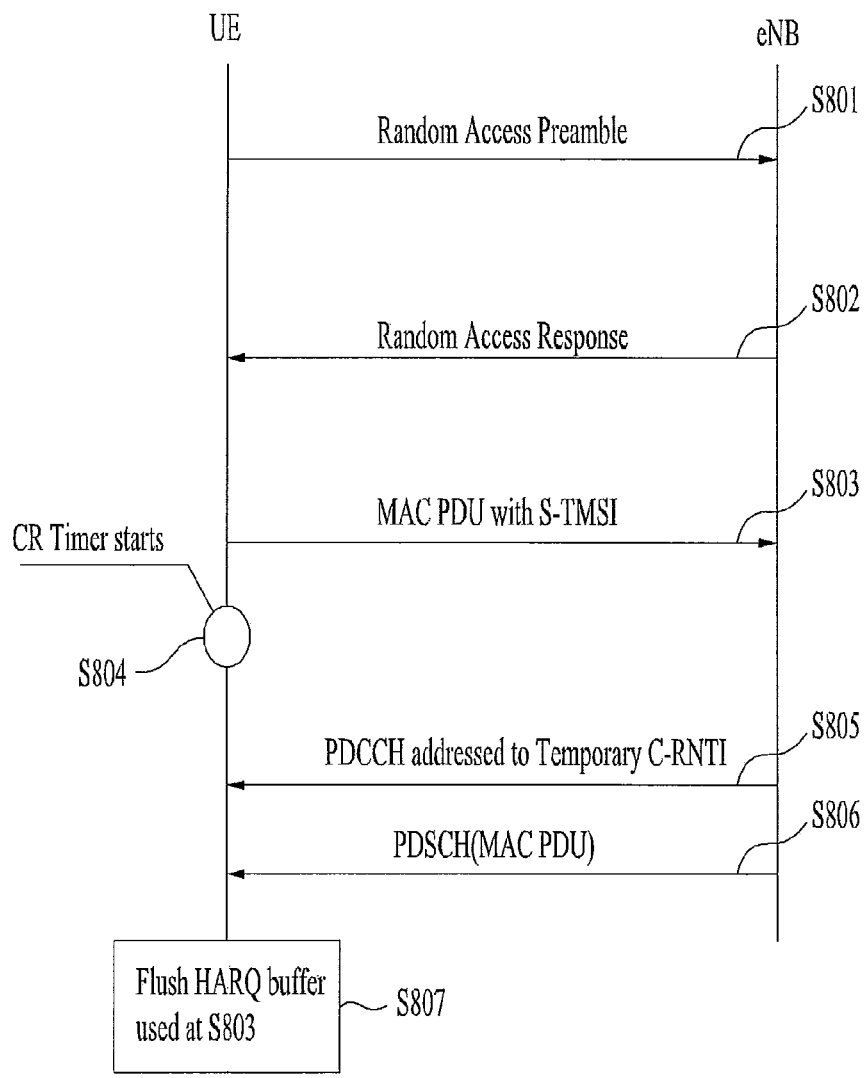
FIG. 8 is a diagram illustrating an operation of UE which performs a random access procedure according to a second embodiment of the present invention.

FIG. 8 is a diagram illustrating an operation of a UE which performs a random access procedure according to a second embodiment of the present invention.

The operations for, at the UE, transmitting a random access preamble to an eNB in order to perform the random access procedure (S801), and receiving a random access response message corresponding thereto (S802) are equal to those of the first embodiment.

It is assumed that the UE according to the present embodiment does not have a cell identifier (C-RNTI) determined with respect to the eNB in this state. In this case, the UE may include its unique identifier (e.g., S-TMSI or a random ID) in a MAC PDU and transmit the MAC PDU when Message 3 is transmitted. The unique identifier of the UE used for the contention resolution procedure may be called a "UE contention resolution identity".

It is assumed that the GE according to the present embodiment configures the MAC PDU including the S-TMSI and transmits the MAC PDU to the eNB (S803). The MAC PDU of the UE is also configured by a multiplexing and assembly entity of a MAC layer, is stored in the Msg3 buffer, and is stored in a HARQ buffer of a specific HARQ process used for transmission of Message 3 again.

The UE which transmits Message 3 using the specific HARQ process may start a CR timer (S804). In the present embodiment, it is assumed that the UE receives a PDCCH signal from the eNB before the CR timer expires (S805). When the UE receives the PDCCH, the UE according to the present embodiment may determine whether the PDCCH signal is received using the cell identifier (C-RNTI) used for the current random access procedure.

If the received PDCCH is not received using the temporary cell identifier of the UE or the S-TMSI of the UE is not included in the PDSCH received via the radio area corresponding to the PDCCH, the UE may consider the contention resolution procedure as not successful and perform the subsequent operations according to the failure of the contention resolution procedure.

The UE according to the present embodiment may perform the operation according to the failure of the contention resolution procedure, which is described in the first embodiment. In addition, the UE according to the present embodiment is configured to perform an operation for flushing a HARQ buffer of a specific HARQ process used for transmission of Message 3 prior to the operation according to the failure of the contention resolution procedure. By flushing the HARQ buffer in the operation in which the UE considers the contention resolution procedure as not successful, the unnecessary retransmission described with respect to FIG. 6 can be prevented.

Third Embodiment

Figure 9:
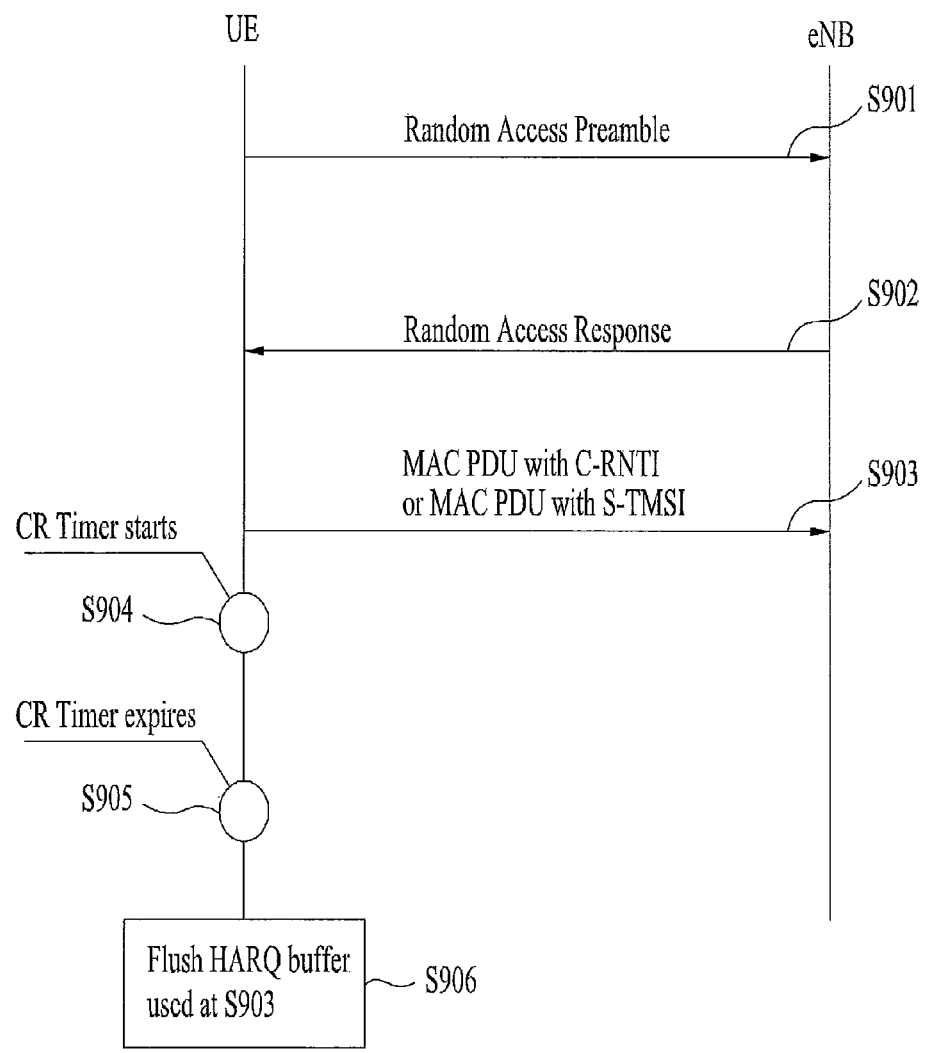
FIG. 9 is a diagram illustrating an operation of a UE which performs a random access procedure according to a third embodiment of the present invention.

FIG. 9 is a diagram illustrating an operation of a UE which performs a random access procedure according to a third embodiment of the present invention.

The operations for, at the UE, transmitting a random access preamble to an eNB in order to perform the random access procedure (S901), and receiving a random access response message corresponding thereto (S902) are equal to those of the first embodiment.

In the present embodiment, the UE may include both a cell identifier (C-RNTI) and a UE contention resolution identity (for example, S-TMSI) in a MAC PDU transmitted via. Message 3 and transmit the MAC PDU (S903).

When the UE transmits Message 3, the UE may start a CR timer (S904). In the present embodiment, if Message 4 corresponding to the transmission of Message 3 of the UE is not received from the eNB before the contention resolution timer expires (S905), the UE may consider the contention resolution procedure as not successful and perform the subsequent operations according to the failure of the contention resolution procedure. At this time, the UE according to the present embodiment is configured to perform an operation for flushing a HARQ buffer of a specific HARQ process used for transmission of Message 3 prior to the operation according to the failure of the contention resolution procedure. By flushing the HARQ buffer in the operation in which the UE considers the contention resolution procedure as not successful, the unnecessary retransmission described with respect to FIG. 6 can be prevented.

The first to third embodiments described with reference to FIGS. 7 to 9 may be associated with the case where the UE considers the contention resolution procedure as not successful. If the UE considers the contention resolution procedure as not successful, the HARQ buffer used for the previous random access procedure is flushed as an example of the subsequent operation such that MAC PDU retransmission unnecessary for the additional random access operation is prevented and the HARQ operation is clarified.

Meanwhile, the TAT indicating the uplink synchronization state of the UE according to another embodiment of the present invention will be described.

As described above, when the UE receives a TAC from the eNB, the UE may apply the TAC and start or restart the TAT. The UE may be uplink synchronized with the eNB so as to transmit an uplink signal to the eNB only during the operation of the TAT. If the TAT expires, the UE may flush all the HARQ buffers and notify an RRC layer of the release of a PUCCH and an SRS. In addition, all downlink allocation information and UL Grant information may be deleted.

In another embodiment of the present invention, in addition to the case where the TAT expires, even when the TAT is stopped, the HARQ buffer is flushed. More particularly, the UE is configured to stop the TAT if it is considered that the contention resolution procedure fails as described above with respect to FIGS. 7 to 9. Accordingly, in addition to the case where the TAT of the UE expires, if the TAT is stopped, the HARQ buffer corresponding to the stopping of the TAT is flushed such that unnecessary uplink data retransmission of the subsequent procedure can be prevented.

Meanwhile, according to the above-described embodiments of the present invention, the random access operation of the UE is performed as follows.

Figure 10:
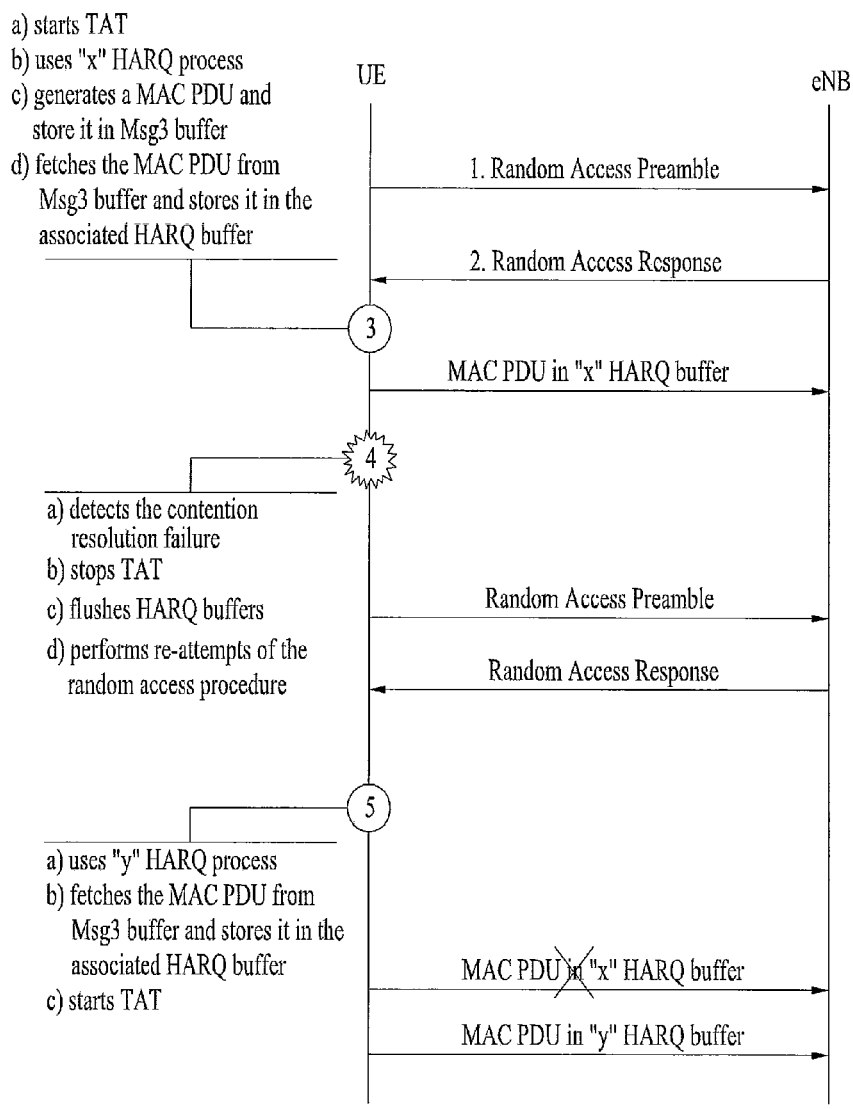
FIG. 10 is a diagram illustrating a procedure in which a UE performs a random access procedure with respect to an eNB according to an embodiment of the present invention.

FIG. 10 is a diagram illustrating a procedure in which a UE performs a random access procedure with respect to an eNB according to an embodiment of the present invention.

Step 1: The UE may transmit a random access preamble to the eNB in order to perform a contention based random access procedure.

Step 2: The eNB may transmit a random access response message to the UE.

Step 3: The UE may apply a TAC included in the random access response so as to start or restart a TAT. In addition, the UE may generate a MAC PDU according to uplink scheduling information included in the random access response and store the MAC PDU in a Message 3 (Msg3) buffer. Then, the UE may fetch the MAC PDU from the Msg3 buffer, store the MAC PDU in an associated HARQ buffer (a HARQ buffer associated with an x HARQ process, in the present embodiment) again, and transmit the MAC PDU stored in the HARQ buffer to the eNB at a transmission time point of the HARQ process. In addition, the contention resolution timer may be started.

Step 4: If the CR timer expires, if the UE has not received the PDCCH addressed to the cell identifier of the UE after transmitting Message 3 including the cell identifier (C-RNTI) or if the cell identifier (C-RNTI) is not allocated to the UE, the UE includes an upper identifier (S-TMSI or a random ID) in a message according to uplink scheduling information included in the random access response and transmits the message, and the same information as the upper identifier is not included in PDSCH data corresponding to a PDCCH indicated and transmitted by the eNB, the UE may determine that the contention resolution procedure, which is currently performed, fails and, more particularly, the contention resolution procedure fails. The UE according to the present embodiment is configured to discard the data stored in the HARQ buffer of the UE if it is considered that the contention resolution procedure fails.

In addition, the UE may transmit a random access preamble to the eNB and receive a random access response from the eNB, in order to reattempt the random access procedure.

Step 5: The UE may apply a TAC included in the random access response so as to restart a TAT. In addition, the UE may fetch the MAC PDU from the Msg3 buffer and store the MAC PDU in an associated HARQ buffer (a HARQ buffer associated with a y HARQ process, in the present embodiment) and prepare for the transmission of the MAC PDU at a transmission time point of the HARQ process.

As described above, in the LTE system, if data is stored in its HARQ buffer at transmission time points corresponding to a plurality of HARQ processes, the HARQ operation is configured to retransmit the data to the eNB. In the present embodiment, since the MAC PDU stored in the x HARQ process is flushed in Step 4, unnecessary data retransmission at the transmission time point corresponding to the x HARQ process is not performed.

Hereinafter, the configuration of a UE according to an embodiment of the present invention will be described.

In a mobile communication system, the UE may include a signal input module, a display module, an antenna, a signal processor, and the like. Among these modules, the configuration of the processor of the UE for performing a random access operation according to an embodiment of the present invention will be described.

Figure 11:
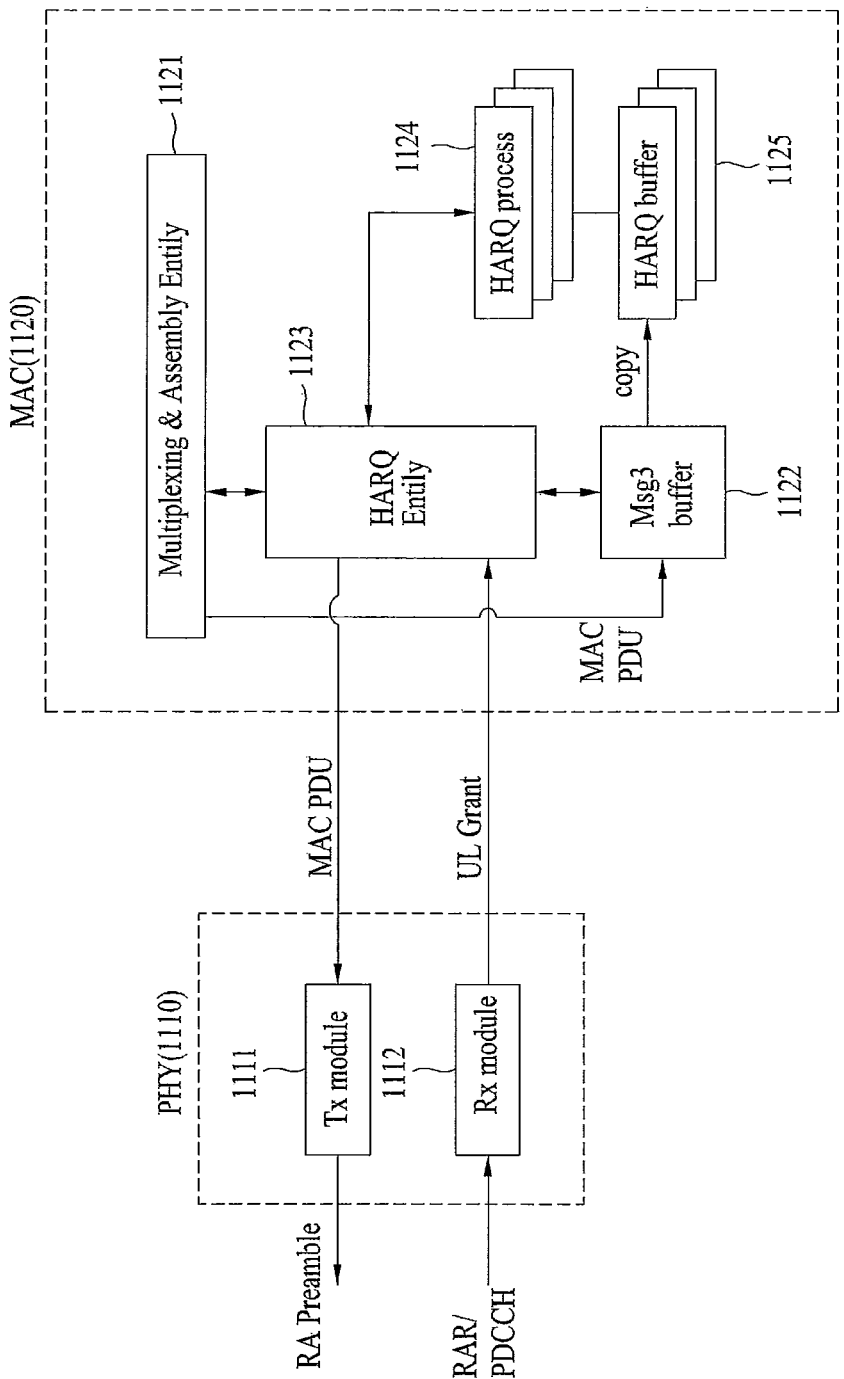
FIG. 11 is a diagram showing the configuration of a processor of a UE according to an embodiment of the present invention.

FIG. 11 is a diagram showing the configuration of a processor of a UE according to an embodiment of the present invention.

Figure 2:
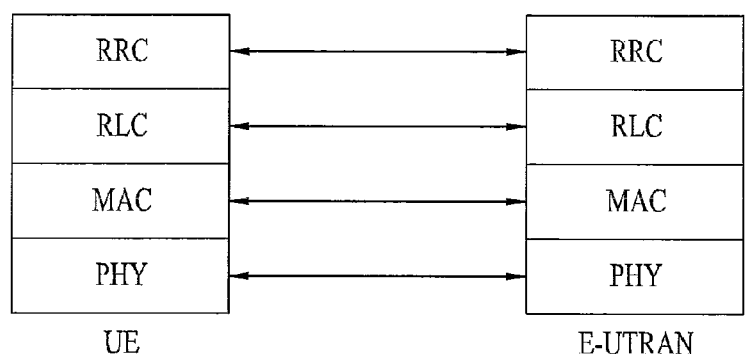
FIGS. 2 and 3 are diagrams showing the architectures of the radio interface protocol between a User Equipment (UE) and a UMTS Terrestrial Radio Access Network (UTRAN) based on the 3$^{rd}$ Generation Partnership Project (3GPP) radio access network standard.
Figure 3:
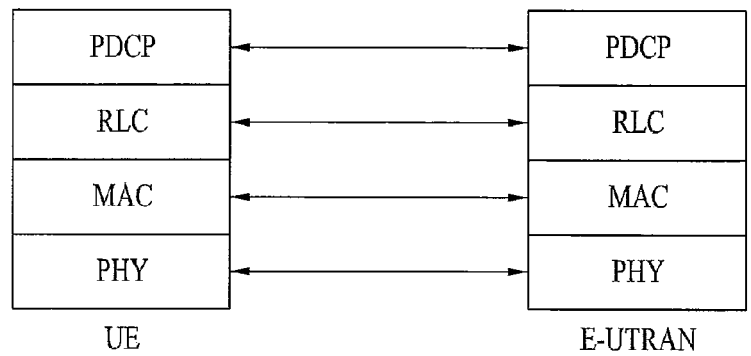
Figure 4:
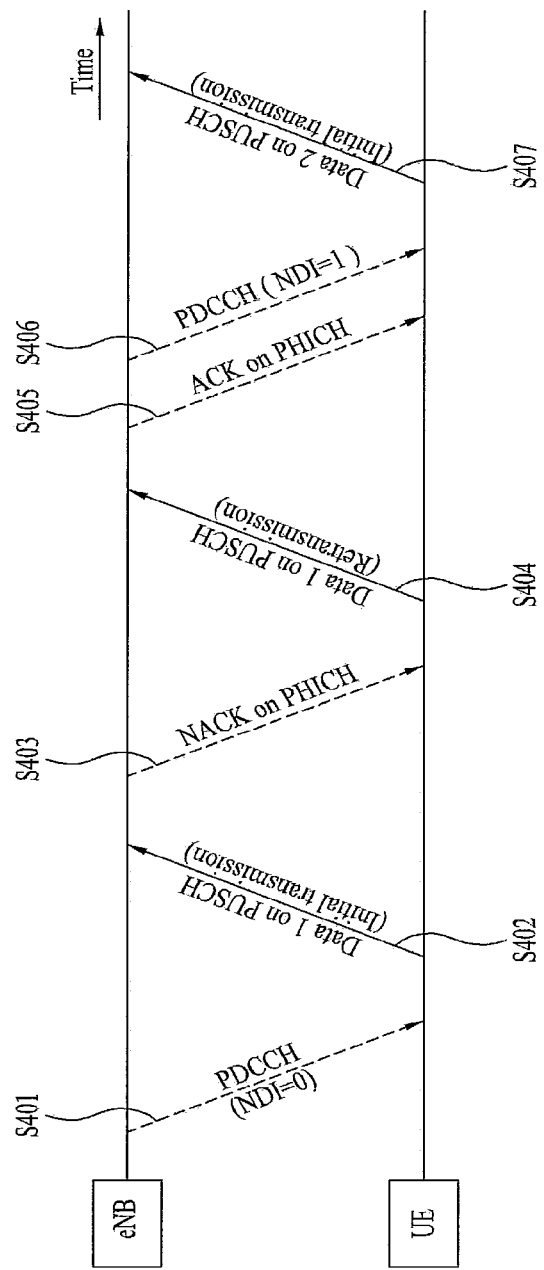
FIG. 4 is a diagram showing a HARD operation performed in the LTE system.
Figure 5:
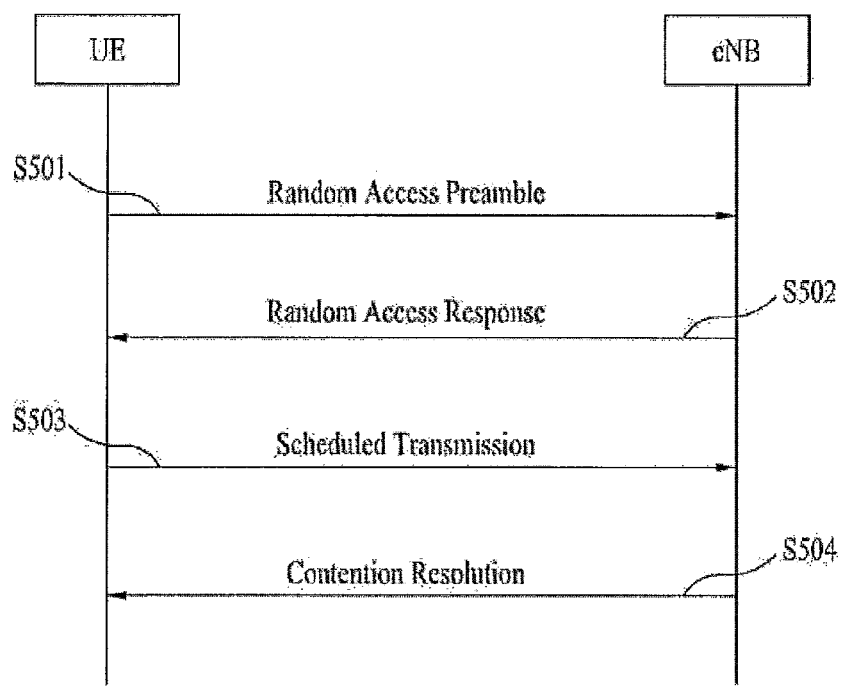
FIG. 5 is a diagram illustrating an operation procedure of a UE and an eNB in a contention based random access procedure.

As shown in FIG. 11, the processor of the UE may have a layer structure shown in FIGS. 2 and 3. Among these layers, the physical layer module 1110 and the MAC layer module 1120 according to the present embodiment will be described.

The physical layer module 1110 of the UE according to the present embodiment may include a Transmission (Tx) module 1111 configured to transmit a Random Access (RA) preamble to an eNB and a reception (Rx) module 1112 configured to receive a Random Access Response (RAR) message including UL Grant information from the eNB. In addition, the MAC layer module 1120 of the UE according to the present embodiment may include a multiplexing and assembly entity 1121 configured to configure a MAC PDU including uplink data and UE identifier according to the UL Grant information received by the Rx module 1112, a Msg3 buffer 1122 configured to More the MAC PDU configured by the multiplexing and assembly entity 1121 according to the reception of the RAR message, a plurality of HARQ process modules 1124, a plurality of HARQ buffers 1125 respectively corresponding to the plurality of HARQ process modules, and a HARQ entity 1123 for controlling the operation's of the plurality of HARQ process modules 1124.

More particularly, the MAC layer module 1120 may be configured to copy the MAC PDU stored in the Msg3 buffer 1122 in a first HARQ buffer 1125 corresponding to a first HARQ process module 1124 of the plurality of HARQ process modules according to the reception of the RAR message. In addition, the MAC layer module 1120 may control the MAC PDU stored in the first HARQ buffer 1125 to be transmitted to the eNB via the Tx module 1111 using the first HARQ process module 1124. When the MAC PDU stored in the first HARQ buffer 1125 is transmitted, the MAC layer module 1120 may be configured to start or restart the CR timer.

Meanwhile, if the physical layer module 1110 reports the reception of the PDCCH from the eNB, the MAC layer module 1120 may determine whether the PDCCH signal or the PDSCH signal associated with the PDCCH signal is addressed to the UE identifier or whether the CR timer has expired. If the PDCCH or the PDSCH associated with the PDCCH is not addressed to the UE identifier or if the CR timer has expired, the MAC layer module 1120 of the UE according to the present embodiment is configured to flush the first HARQ buffer 1125.

If the MAC layer module 1120 considers the contention resolution procedure as not successful, the MAC layer module 1120 stops the TAT. More particularly, if the TAT expires or is stopped, the MAC layer module may be configured to flush the MAC PDU stored in the first HARQ buffer 1125.

Although the present invention is described with respect to a signal transmission or reception technology and a user equipment for the same applied to a 3GPP LTE system, the present invention is applicable to various mobile communication systems having similar procedures in addition to the 3GPP LTE system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing random access to a base station by a terminal, the method comprising:
   transmitting a random access preamble to the base station;
   receiving, from the base station in response to the random access preamble, a random access response message including uplink grant information; and
   storing a Medium Access Control Packet Data Unit (MAC PDU) including uplink data and an identifier of the terminal in a message 3 (Msg3) buffer in response to the uplink grant information;
   copying the MAC PDU stored in the Msg3 buffer to a first Hybrid Automatic Repeat Request (HARQ) buffer associated with a first HARQ process, wherein the terminal comprises multiple HARQ buffers including the first HARQ buffer;
   transmitting the MAC PDU stored in the first HARQ buffer to the base station using the first HARQ process;
   starting or restarting a Contention Resolution (CR) timer;
   receiving, from the base station, a Physical Downlink Control Channel (PDCCH) signal;
   stopping a Timing Alignment Timer (TAT), if the received PDCCH signal or a Physical Downlink Shared Channel (PDSCH) signal associated with the received PDCCH signal does not match the identifier of the terminal or if the CR timer expires; and
   flushing the multiple HARQ buffers including the first HARQ buffer, when the TAT expires.

2. The method of claim 1, wherein the terminal considers a contention resolution as not successful, if the received PDCCH signal or a physical downlink shared channel (PDSCH) signal associated with the received PDCCH signal does not match the identifier of the terminal or if the CR timer expires.

3. The method of claim 2, wherein the identifier of the terminal is one of a Cell-Radio Network Temporary Identifier (C-RNTI) of the terminal or a UE contention resolution identity of the terminal.

4. The method of claim 3, wherein the terminal considers the contention resolution as not successful, when the terminal has transmitted the MAC PDU including the C-RNTI of the terminal and the received PDCCH signal is not addressed to the C-RNTI of the terminal.

5. The method of claim 3, wherein the terminal considers the contention resolution as not successful, when the terminal has transmitted the MAC PDU including the UE contention resolution identity of the terminal and the PDSCH signal associated with the received PDCCH signal does not match the UE contention resolution identity of the terminal.

6. The method of claim 2, further comprising:
   retransmitting the selected random access preamble to the base station according to the failure of the contention resolution;
   receiving a random access response message including a Timing Alignment Command (TAC) from the base station;
   starting or restarting a Timing Alignment Timer (TAT) according to the reception of the TAC;
   copying the MAC PDU stored in the Msg3 buffer to a second HARQ buffer associated with a second HARQ process; and
   transmitting the MAC PDU stored in the second HARQ buffer to the base station using the second HARQ process,
   wherein the terminal does not transmit the MAC PDU stored in the first HARQ buffer even when the TAT is started or restarted.

7. The method of claim 1, wherein the first HARQ buffer is flushed, if the received PDCCH signal or the PDSCH signal associated with the received PDCCH signal does not match the identifier of the terminal or if the CR timer expires.

8. A terminal comprising:
   a physical layer module including:
      a transmission module configured to transmit a random access preamble to a base station, and
      a reception module configured to receive a random access response message including uplink grant information from the base station; and
   a Medium Access control (MAC) layer module including:
      a multiplexing and assembly entity configured to configure a Medium Access Control Packet Data Unit (MAC PDU) including uplink data and an identifier of the terminal according to the uplink grant information received by the reception module,
      a message 3 (Msg3) buffer configured to store the MAC PDU configured by the multiplexing and assembly entity according to the reception of the random access response message, a plurality of Hybrid Automatic Repeat Request (HARQ) process modules and a plurality of HARQ buffers associated with the plurality of HARQ process modules, and a HARQ entity configured to control operations of the plurality of HARQ process modules, wherein the MAC layer module copies the MAC PDU stored in the Msg3 buffer to a first HARQ buffer associated with a first HARQ process according to the reception of the random access response message by the reception module, controls the MAC PDU stored in the first HARQ buffer to be transmitted to the base station using the first HARQ process, and starts or restarts a Contention Resolution (CR) timer when transmitting the MAC PDU stored in the first HARQ buffer, and wherein, if reception of a Physical Downlink Control Channel (PDCCH) signal from the base station is reported from the physical layer module, is the MAC layer module determines whether the PDCCH or a Physical Downlink Shared Channel (PDSCH) signal associated with the PDCCH signal matches the identifier of the terminal or whether the CR timer expires, and stops a Timing Alignment Timer (TAT), if the PDCCH signal or the PDSCH signal associated with the PDCCH signal does not match the identifier of the terminal or if the CR timer expires, wherein the MAC layer module flushes the plurality of HARQ buffers when the TAT expires.

9. The terminal of claim 8, wherein the MAC layer module considers a contention resolution as not successful, if the received PDCCH signal or the PDSCH signal associated with the received PDCCH signal does not match the identifier of the terminal or if the CR timer expires.

10. The terminal of claim 8, wherein the identifier of the terminal is one of a Cell-Radio Network Temporary Identifier (C-RNTI) of the terminal or a UE contention resolution identity of the terminal.

11. The terminal of claim 10, wherein the MAC layer module considers the contention resolution as not successful, when the terminal has transmitted the MAC PDU including the C-RNTI of the terminal and the received PDCCH signal is not addressed to the C-RNTI of the terminal.

12. The terminal of claim 10, wherein the MAC layer module considers the contention resolution as not successful, when the terminal has transmitted the MAC PDU including the UE contention resolution identity of the terminal and the PDSCH associated with the received PDCCH signal does not match the UE contention resolution identity of the terminal.

13. The terminal of claim 8, wherein the MAC layer module flushes the first HARQ buffer, if the received PDCCH signal or the PDSCH signal associated with the received PDCCH signal does not match the identifier of the terminal or if the CR timer expires.

* * * * *